United States Patent
Chen

(10) Patent No.: US 9,141,176 B1
(45) Date of Patent: Sep. 22, 2015

(54) POWER MANAGEMENT FOR DATA STORAGE DEVICE

(71) Applicant: Western Digital Technologies, Inc., Irvine, CA (US)

(72) Inventor: Huayuan Chen, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 91 days.

(21) Appl. No.: 14/024,498

(22) Filed: Sep. 11, 2013

Related U.S. Application Data

(60) Provisional application No. 61/859,452, filed on Jul. 29, 2013.

(51) Int. Cl.
| | | |
|---|---|---|
| G11B 15/18 | (2006.01) | |
| G06F 1/32 | (2006.01) | |
| G11B 15/43 | (2006.01) | |
| G11B 5/60 | (2006.01) | |

(52) U.S. Cl.
CPC ............ G06F 1/3268 (2013.01); G11B 5/6005 (2013.01); G11B 15/43 (2013.01)

(58) Field of Classification Search
None
See application file for complete search history.

(56) References Cited

U.S. PATENT DOCUMENTS

| | | | |
|---|---|---|---|
| 5,333,138 A | 7/1994 | Richards et al. | |
| 5,345,347 A * | 9/1994 | Hopkins et al. | 360/71 |
| 5,420,998 A | 5/1995 | Horning | |
| 5,457,786 A | 10/1995 | Roush | |
| 5,471,604 A | 11/1995 | Hasbun et al. | |
| 5,581,785 A | 12/1996 | Nakamura et al. | |
| 5,586,291 A | 12/1996 | Lasker et al. | |
| 5,636,355 A | 6/1997 | Ramakrishnan et al. | |
| 5,682,273 A | 10/1997 | Hetzler | |
| 5,905,901 A | 5/1999 | Klein | |
| 5,913,067 A | 6/1999 | Klein | |
| 5,954,820 A | 9/1999 | Hetzler | |
| 6,044,439 A | 3/2000 | Ballard et al. | |
| 6,115,200 A | 9/2000 | Allen et al. | |
| 6,236,527 B1 | 5/2001 | Uchiike et al. | |
| 6,275,949 B1 | 8/2001 | Watanabe | |
| 6,295,577 B1 | 9/2001 | Anderson et al. | |
| 6,408,357 B1 | 6/2002 | Hanmann et al. | |
| 6,429,990 B2 | 8/2002 | Serrano et al. | |
| 6,437,935 B1 | 8/2002 | Johnson et al. | |
| 6,614,616 B1 | 9/2003 | Michel et al. | |
| 6,661,591 B1 | 12/2003 | Rothberg | |
| 6,662,267 B2 | 12/2003 | Stewart | |

(Continued)

OTHER PUBLICATIONS

Boyle, et. al., U.S. Appl. No. 12/824,959, filed Jun. 28, 2010, 21 pages.

(Continued)

*Primary Examiner* — Tan X Dinh

(57) ABSTRACT

Power management for a data storage device (DSD). A number of host commands is counted within a predetermined time period. Data is stored on at least one disk of the DSD or in a solid state memory of the DSD based on whether the number of commands within the predetermined time period exceeds a threshold number of commands. According to another aspect, a performance mode for operation of a DSD is set based on a number of consecutive time periods where the DSD receives more than a threshold number of host commands. A power saving mode for operation of the DSD is set based on a number of consecutive time periods where the DSD receives less than the threshold number of host commands.

24 Claims, 3 Drawing Sheets

(56) References Cited

U.S. PATENT DOCUMENTS

| | | |
|---|---|---|
| 6,687,850 B1 | 2/2004 | Rothberg |
| 6,725,397 B1 | 4/2004 | Emberty et al. |
| 6,732,241 B2 | 5/2004 | Riedel |
| 6,754,021 B2 | 6/2004 | Kisaka et al. |
| 6,798,599 B2 | 9/2004 | Dykes et al. |
| 6,807,630 B2 | 10/2004 | Lay et al. |
| 6,845,456 B1 | 1/2005 | Menezes et al. |
| 6,856,556 B1 | 2/2005 | Hajeck |
| 6,892,313 B1 | 5/2005 | Codilian et al. |
| 6,909,574 B2 | 6/2005 | Aikawa et al. |
| 6,928,518 B2 | 8/2005 | Talagala |
| 6,968,450 B1 | 11/2005 | Rothberg et al. |
| 7,003,620 B2 | 2/2006 | Avraham et al. |
| 7,017,037 B2 | 3/2006 | Fortin et al. |
| 7,028,174 B1 | 4/2006 | Atai-Azimi et al. |
| 7,076,605 B1 | 7/2006 | Son |
| 7,082,494 B1 | 7/2006 | Thelin et al. |
| 7,107,444 B2 | 9/2006 | Fortin et al. |
| 7,114,029 B1 | 9/2006 | Thelin |
| 7,120,806 B1 | 10/2006 | Codilian et al. |
| 7,126,857 B2 | 10/2006 | Hajeck |
| 7,139,933 B2 | 11/2006 | Hsu et al. |
| 7,142,385 B2 | 11/2006 | Shimotono et al. |
| 7,206,948 B2 | 4/2007 | Brauer |
| 7,231,198 B2 | 6/2007 | Loughran |
| 7,254,721 B1 | 8/2007 | Tobias et al. |
| 7,275,166 B2 | 9/2007 | Kaiju et al. |
| 7,334,082 B2 | 2/2008 | Grover et al. |
| 7,340,647 B2 | 3/2008 | Aasheim et al. |
| 7,350,105 B2 | 3/2008 | Aasheim et al. |
| 7,392,340 B1 | 6/2008 | Dang et al. |
| 7,395,452 B2 | 7/2008 | Nicholson et al. |
| 7,411,757 B2 | 8/2008 | Chu et al. |
| 7,421,552 B2 | 9/2008 | Long |
| 7,425,810 B2 | 9/2008 | Hobbet et al. |
| 7,430,136 B2 | 9/2008 | Merry, Jr. et al. |
| 7,447,807 B1 | 11/2008 | Merry et al. |
| 7,461,202 B2 | 12/2008 | Forrer, Jr. et al. |
| 7,468,854 B2 | 12/2008 | Yamashita et al. |
| 7,472,222 B2 | 12/2008 | Auerbach et al. |
| 7,477,477 B2 | 1/2009 | Maruchi et al. |
| 7,483,234 B2 | 1/2009 | Shimozato |
| 7,502,256 B2 | 3/2009 | Merry, Jr. et al. |
| 7,509,441 B1 | 3/2009 | Merry et al. |
| 7,509,471 B2 | 3/2009 | Gorobets |
| 7,516,346 B2 | 4/2009 | Pinheiro et al. |
| 7,552,347 B2 | 6/2009 | Schutte |
| 7,596,643 B2 | 9/2009 | Merry, Jr. et al. |
| 7,610,438 B2 | 10/2009 | Lee et al. |
| 7,610,445 B1 | 10/2009 | Manus et al. |
| 7,613,876 B2 | 11/2009 | Bruce et al. |
| 7,620,773 B2 | 11/2009 | Nicholson et al. |
| 7,644,231 B2 | 1/2010 | Recio et al. |
| 7,647,513 B2 | 1/2010 | Tobias et al. |
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |
| 7,685,360 B1 | 3/2010 | Brunnett et al. |
| 7,685,374 B2 | 3/2010 | Diggs et al. |
| 7,698,586 B2 | 4/2010 | Kim et al. |
| 7,719,785 B2 | 5/2010 | Taniguchi et al. |
| 7,733,712 B1 | 6/2010 | Walston et al. |
| 7,752,491 B1 | 7/2010 | Liikanen et al. |
| 7,765,373 B1 | 7/2010 | Merry et al. |
| 7,774,556 B2 | 8/2010 | Karamcheti et al. |
| 7,797,487 B2 | 9/2010 | Lubbers et al. |
| 7,817,372 B2 | 10/2010 | Takahashi |
| 7,835,104 B2 | 11/2010 | Yamashita et al. |
| 7,890,696 B2 | 2/2011 | Lawson |
| 7,898,855 B2 | 3/2011 | Merry, Jr. et al. |
| 7,912,991 B1 | 3/2011 | Merry et al. |
| 7,936,603 B2 | 5/2011 | Merry, Jr. et al. |
| 7,962,792 B2 | 6/2011 | Diggs et al. |
| 7,984,259 B1 | 7/2011 | English |
| 8,060,707 B2 | 11/2011 | Fairhurst et al. |
| 8,078,901 B1 * | 12/2011 | Meyer et al. ............ 713/501 |
| 8,078,918 B2 | 12/2011 | Diggs et al. |
| 8,090,899 B1 | 1/2012 | Syu |
| 8,095,851 B2 | 1/2012 | Diggs et al. |
| 8,098,451 B2 | 1/2012 | Graef |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,139,307 B2 | 3/2012 | Kim et al. |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,169,726 B2 | 5/2012 | Wilson |
| 8,243,525 B1 | 8/2012 | Kan |
| 8,244,975 B2 | 8/2012 | Decenzo |
| 8,245,003 B2 | 8/2012 | Suzuki et al. |
| 8,254,172 B1 | 8/2012 | Kan |
| 8,261,012 B2 | 9/2012 | Kan |
| 8,286,018 B2 | 10/2012 | Chang et al. |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,644 B2 | 12/2013 | Kumasawa et al. |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,501 B2 | 5/2014 | Flynn et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,773,802 B1 | 7/2014 | Anderson et al. |
| 8,775,720 B1 | 7/2014 | Meyer et al. |
| 8,782,327 B1 | 7/2014 | Kang et al. |
| 8,782,334 B1 | 7/2014 | Boyle et al. |
| 8,788,778 B1 | 7/2014 | Boyle |
| 8,788,779 B1 | 7/2014 | Horn |
| 8,788,880 B1 | 7/2014 | Gosla et al. |
| 8,917,471 B1 * | 12/2014 | Hasfar et al. ............ 360/71 |
| 2002/0083264 A1 | 6/2002 | Coulson |
| 2003/0140198 A1 | 7/2003 | Ninose et al. |
| 2003/0145167 A1 | 7/2003 | Tomita |
| 2004/0049705 A1 * | 3/2004 | Liebenow ............ 713/320 |
| 2005/0108473 A1 | 5/2005 | Le Moal et al. |
| 2005/0120251 A1 | 6/2005 | Fukumori |
| 2005/0278486 A1 * | 12/2005 | Trika et al. ............ 711/142 |
| 2006/0075185 A1 | 4/2006 | Azzarito et al. |

(56) References Cited

U.S. PATENT DOCUMENTS

| | | |
|---|---|---|
| 2006/0195657 A1 | 8/2006 | Tien et al. |
| 2007/0006021 A1 | 1/2007 | Nicholson et al. |
| 2007/0050540 A1 | 3/2007 | Klein |
| 2007/0162693 A1 | 7/2007 | Nam |
| 2008/0024899 A1 | 1/2008 | Chu et al. |
| 2008/0040537 A1 | 2/2008 | Kim |
| 2008/0049354 A1 | 2/2008 | Nitta |
| 2008/0059694 A1* | 3/2008 | Lee .................. 711/103 |
| 2008/0130156 A1 | 6/2008 | Chu et al. |
| 2008/0177938 A1 | 7/2008 | Yu |
| 2008/0222353 A1 | 9/2008 | Nam et al. |
| 2008/0256287 A1 | 10/2008 | Lee et al. |
| 2008/0288714 A1 | 11/2008 | Salomon et al. |
| 2008/0307270 A1 | 12/2008 | Li |
| 2009/0019218 A1 | 1/2009 | Sinclair et al. |
| 2009/0024793 A1 | 1/2009 | Fontenot et al. |
| 2009/0031072 A1 | 1/2009 | Sartore |
| 2009/0055667 A1* | 2/2009 | Luo et al. ............... 713/322 |
| 2009/0089501 A1 | 4/2009 | Ahn et al. |
| 2009/0103203 A1 | 4/2009 | Yoshida |
| 2009/0106518 A1 | 4/2009 | Dow |
| 2009/0144501 A2 | 6/2009 | Yim et al. |
| 2009/0150599 A1 | 6/2009 | Bennett |
| 2009/0172249 A1 | 7/2009 | Matthews |
| 2009/0172324 A1 | 7/2009 | Han et al. |
| 2009/0172499 A1 | 7/2009 | Olbrich et al. |
| 2009/0198940 A1 | 8/2009 | Ash et al. |
| 2009/0213486 A1 | 8/2009 | Takahashi |
| 2009/0249168 A1 | 10/2009 | Inoue |
| 2009/0271562 A1 | 10/2009 | Sinclair |
| 2009/0327603 A1 | 12/2009 | McKean et al. |
| 2010/0067138 A1 | 3/2010 | Ooi et al. |
| 2010/0088459 A1 | 4/2010 | Arya et al. |
| 2010/0122030 A1 | 5/2010 | Peters et al. |
| 2010/0169541 A1 | 7/2010 | Freikorn |
| 2010/0174849 A1 | 7/2010 | Walston et al. |
| 2010/0191922 A1 | 7/2010 | Dickey et al. |
| 2010/0195243 A1 | 8/2010 | Zhu et al. |
| 2010/0250793 A1 | 9/2010 | Syu |
| 2010/0325352 A1 | 12/2010 | Schuette et al. |
| 2011/0010490 A1 | 1/2011 | Kwon et al. |
| 2011/0099323 A1 | 4/2011 | Syu |
| 2011/0106804 A1 | 5/2011 | Keeler et al. |
| 2011/0283049 A1 | 11/2011 | Kang et al. |
| 2011/0283128 A1* | 11/2011 | Farhan et al. ............ 713/324 |
| 2012/0170435 A1 | 7/2012 | Trantham |
| 2012/0260020 A1 | 10/2012 | Suryabudi et al. |
| 2012/0278531 A1 | 11/2012 | Horn |
| 2012/0284460 A1 | 11/2012 | Guda |
| 2012/0290779 A1 | 11/2012 | Eleftheriou et al. |
| 2012/0317338 A1 | 12/2012 | Yi et al. |
| 2012/0324191 A1 | 12/2012 | Strange et al. |
| 2013/0024650 A1 | 1/2013 | Ambat et al. |
| 2013/0117520 A1 | 5/2013 | Ryu |
| 2013/0132638 A1 | 5/2013 | Horn et al. |
| 2013/0145106 A1 | 6/2013 | Kan |
| 2013/0173850 A1 | 7/2013 | Song |
| 2013/0275654 A1* | 10/2013 | Chu ..................... 711/103 |
| 2013/0290668 A1 | 10/2013 | Na |
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0133220 A1 | 5/2014 | Danilak et al. |
| 2014/0136753 A1 | 5/2014 | Tomlin et al. |
| 2014/0281127 A1* | 9/2014 | Marcu et al. ............ 711/103 |

OTHER PUBLICATIONS

Boyle, et. al., U.S. Appl. No. 13/105,800, filed May 11, 2011, 19 pages.

Wilkins, et. al.,U.S. Appl. No. 13/157,111, filed Jun. 9, 2011, 16 pages.

Malina, et. al., U.S. Appl. No. 13/673,956, filed Nov. 9, 2012, 40 pages.

Robert L. Horn, U.S. Appl. No. 14/086,916, filed Nov. 21, 2013, 24 pages.

U.S. Appl. No. 12/720,568, filed Mar. 9, 2010, 22 pages.

Payer, et al., "Combo Drive: Optimizing Cost and Performance in a Heterogeneous Storage Device", http://csl.cse.psu.edu/wish2009_papers/Payer.pdf., Proceedings First Workshop on Integrating Solid-State Memory into the Storage Hierarchy, WISH 2009, Mar. 7, 2009, Washington DC, pp. 1-8.

Gokul Soundararajan, Vijayan Prabhakaran, Mahesh Balakrishan, Ted Wobber, "Extending SSD Lifetimes with Disk-Based Write Caches", http://research.microsoft.com/pubs/1153521hybrid.pdf, Feb. 2010.

Xiaojian Wu, A. L. Narasimha Reddy, "Managing Storage Space in a Flash and Disk Hybrid Storage System", Symposium on Modeling, Analysis & Simulation of Computer and Telecommunication Systems 2009 (Mascots '09), Sep. 21-23, 2009, pp. 1-4.

Tao Xie, Deepthi Madathil, "SAIL: Self-Adaptive File Reallocation on Hybrid Disk Arrays", The 15th Annual IEEE International Conference on High Performance Computing (HiPC 2008), Bangalore, India, Dec. 17-20, 2008.

Non-Volatile Memory Host Controller Interface revision 1.0 specification available for download at http://www.intel.com/standards/nvmhci/index.htm. Ratified on Apr. 14, 2008, 65 pages.

DongKyu Lee; Koh, K.; "PDC-NH: Popular data concentration on NAND flash and hard disk drive," 2009 10th IEEE/ACM International Conference on Grid Computing, pp. 196-200, Oct. 13-15, 2009.

* cited by examiner

POWER MANAGEMENT FOR DATA STORAGE DEVICE

CROSS-REFERENCE TO RELATED APPLICATION

This application claims the benefit of U.S. Provisional Application No. 61/859,452, filed on Jul. 29, 2013, which is hereby incorporated by reference in its entirety.

BACKGROUND

Data storage devices (DSDs) are often used in electronic devices such as computer systems to record data onto or to reproduce data from a recording media. As electronic devices such as tablets become more mobile, power requirements become more stringent for DSDs while performance specifications for DSDs such as data transfer rates become more demanding. Improvement in DSD performance often comes at a price of increased power consumption while a reduction of a DSD's power consumption often comes at a price of decreased performance.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed. Reference numbers are reused throughout the drawings to indicate correspondence between referenced elements.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Figure 1:
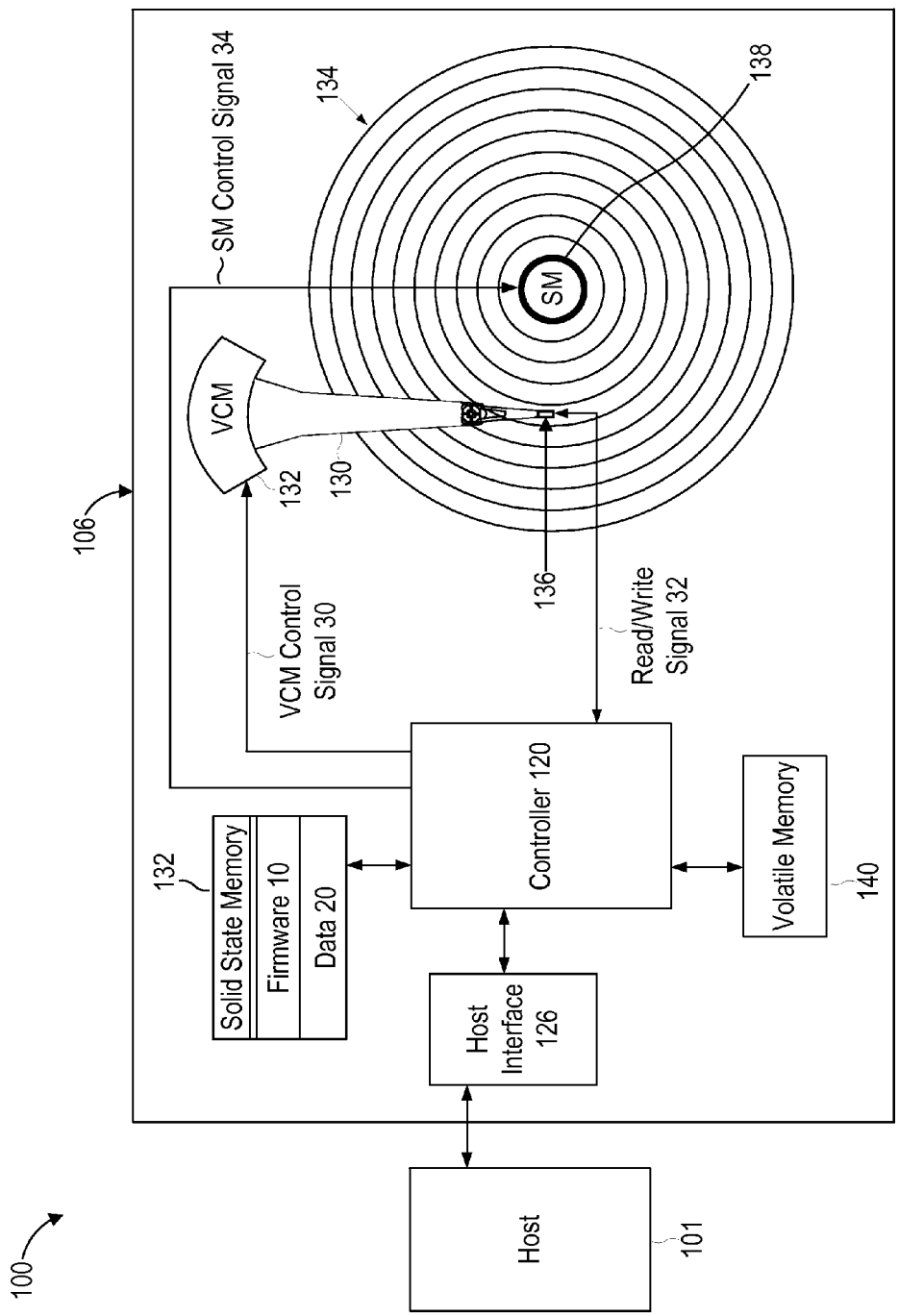
FIG. 1 is a block diagram depicting an electronic device with a data storage device (DSD) according to an embodiment.

FIG. 1 shows electronic device 100 which includes host 101 and data storage device (DSD) 106 according to an embodiment. Electronic device 100 can be, for example, a computer system (e.g., desktop, mobile/laptop, tablet, smartphone, etc.) or other type of electronic device such as a digital video recorder (DVR). In this regard, electronic device 100 may be a stand-alone system or part of a network. Those of ordinary skill in the art will appreciate that electronic device 100 and/or DSD 106 can include more or less than those elements shown in FIG. 1 and that the disclosed power management processes may be implemented in other environments.

In the embodiment of FIG. 1, DSD 106 is a solid state hybrid drive (SSHD) that includes both magnetic recording media (e.g., disk 134) and solid state recording media (e.g., solid state memory 132) as non-volatile memory (NVM) for storing data. While the description herein refers to solid state memory generally, it is understood that solid state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

In one embodiment, DSD 106 includes controller 120 which includes circuitry such as one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof. In one implementation, controller 120 can include a system on a chip (SoC).

Host interface 126 is configured to interface DSD 106 with host 101 and may interface according to a standard such as, for example, PCI express (PCIe), serial advanced technology attachment (SATA), or serial attached SCSI (SAS). As will be appreciated by those of ordinary skill in the art, host interface 126 can be included as part of controller 120. Although FIG. 1 depicts the co-location of host 101 and DSD 106, in other embodiments the two need not be physically co-located. In such embodiments, DSD 106 may be located remotely from host 101 and connected to host 101 via a network interface.

In the example of FIG. 1, DSD 106 includes rotating magnetic disk 134 which is rotated by spindle motor (SM) 138. DSD 106 also includes head 136 connected to the distal end of actuator 130 which is rotated by voice coil motor (VCM) 132 to position head 136 over disk 134. Controller 120 can include servo control circuitry (not shown) to control the position of head 136 and the rotation of disk 134 using VCM control signal 30 and SM control signal 34, respectively.

Disk 134 comprises a number of radial spaced, concentric tracks for storing data and can form part of a disk pack (not shown) which can include additional disks below disk 134 that rotate about SM 138. Head 136 includes at least a read element (not shown) for reading data from disk 134, and a write element (not shown) for writing data on disk 134.

In operation, host interface 126 receives host read and write commands from host 101 via host interface 126 for reading data from disk 134 and writing data to disk 134. In response to a write command from host 101, controller 120 may buffer the data to be written for the write command in volatile memory 140. A read/write channel (not shown) of controller 120 may then encode the buffered data into write signal 32 which is provided to head 136 for magnetically writing data to the surface of disk 134. In response to a read command from host 101, controller 120 controls head 136 to magnetically read data stored on the surface of disk 134 and to send the read data as read signal 32. The read/write channel of controller 120 can then decode and buffer the data into volatile memory 140 for transmission to host 101 via host interface 126.

In the embodiment of FIG. 1, DSD 106 also includes solid state memory 132 for storing data. Solid state memory 132 stores firmware 10 which can include computer-readable instructions used by DSD 106 to implement the power management processes described below. Solid state memory 132 also stores data 20 which can include data stored in accordance with a host write command and/or data accessed in accordance with a host read command.

Volatile memory 140 can include, for example, a dynamic random access memory (DRAM) which can be used by DSD 106 to temporarily store data. Data stored in volatile memory 140 can include data read from NVM (e.g., disk 134 and solid state memory 132), data to be written to NVM, instructions loaded from firmware 10 for execution by controller 120, and/or data used in executing firmware 10.

As discussed in more detail below, DSD 106 can operate in a power saving mode and a performance mode based on a workload received from host 101 during a predetermined time period. Settings for DSD 106 can differ based on whether DSD 106 is in the power saving mode, the performance mode, or some other mode.

Figure 2:
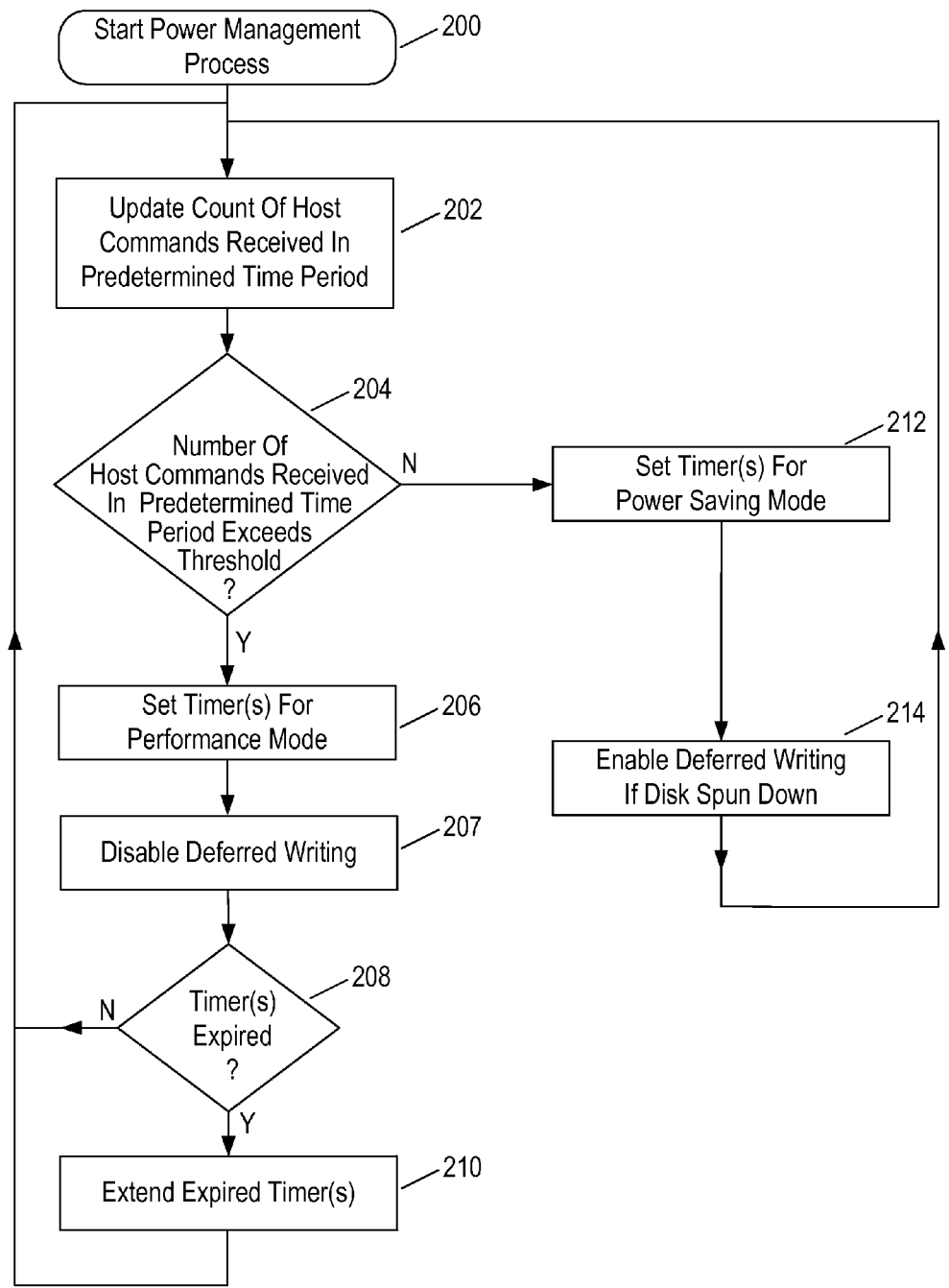
FIG. 2 is a flowchart for a power management process according to an embodiment.

FIG. 2 is a flowchart for a power management process which can be performed by controller 120 to adjust power settings for DSD 106 based on a workload received from host 101 according to one embodiment. The process begins in block 200, and controller 120 in block 202 updates a count of the number of host commands received from host 101 within a predetermined time period.

In block 204, controller 120 determines whether the number of received host commands exceeds a threshold number of commands for the predetermined time period. In this regard, the predetermined time period can be thought of as a sliding window and controller 120 in block 204 checks whether the number of host commands received in the sliding window exceeds a threshold. In one implementation, the threshold number of host commands can be set to 50 and the predetermined time period can be set to two seconds.

If the number of received host commands exceeds the threshold in block 204, at least one timer is set in block 206 to correspond to a performance mode of DSD 106. Generally, at least one timer can be increased in block 206 to improve performance of DSD 106 in the performance mode. DSD 106 may use such timers to initiate various low power states. In one implementation, DSD 106 may move head 136 away from disk 134 (i.e., park head 136) after two seconds of not receiving any commands to read data from or write data to any of the disks in the disk pack including disk 134. This can be part of an idle mode for the hard disk portion of the NVM of DSD 106. After an additional one second or total of no commands for the disks in the past three seconds, DSD 106 may further reduce the angular velocity at which the disk pack spins (i.e., spin down) to further reduce power consumption by the hard disk portion of the NVM.

Low power state timers can also be used for the solid state portion of the NVM. In one implementation, power is decreased to solid state memory 132 after no commands have been received in 100 ms for the solid state memory 132 to reduce power consumption by solid state memory 132. After an additional 200 ms of no commands, power for solid state memory 132 may be further reduced. In this regard, the power for solid state memory 132 may be reduced in a series of stages after the expiration of successive time periods without commands for solid state memory 132.

In addition, a low power state timer can be used for portions of host interface 126 where portions of host interface 126 are no longer powered after receiving no host commands in a specified timeframe.

When setting the timers for the performance mode in block 206, controller 120 may increase the low power state timers of DSD 106 so that the low power states of DSD 106 are delayed. Using the example timers provided above, controller 120 in block 206 may set the timers for the performance mode by increasing the timer for parking head 136 from two seconds to three seconds after not receiving any commands for use of the disks and by increasing the timer for spinning down the disk pack from three seconds to four seconds after not receiving any commands for the disks.

For the solid state portion of the NVM, controller 120 may, for example, increase a first timer for reducing power for solid state memory 132 from 100 ms to 150 ms after receiving no commands for solid state memory 132. A time limit for powering off portions of host interface 126 may also be increased in block 206. Additional low power state timers may also be increased in block 206.

By increasing timers for the low power states in the performance mode, DSD 106 can ordinarily complete host commands quicker by delaying DSD 106 from entering a low power state. Since periods of increased host commands usually have host commands clustered together, it is generally more likely that additional host commands may soon follow a time period when the threshold number of host commands has been exceeded. A timer or timers for entering a low power state are therefore increased in block 206 to allow for quicker performance of host commands that may soon follow a period of increased host commands.

In block 207, a deferred writing capability of DSD 106 is disabled to further improve performance of host commands. The deferred writing capability allows DSD 106 to write data for host commands that are to be written to the disk pack to solid state memory 132 instead and then later write the data to its intended location in the disk pack. This deferred writing can ordinarily allow for servicing of host write commands for writes intended for the disk pack while performing other operations in the disk pack. However, writing data to solid state memory, such as solid state memory 132, is typically slower than writing data to disk 134 when disk 134 is spun up to a speed in performance mode at which data is usually written to or read from disk 134 (e.g., an operating speed of 5,400 RPM). The slower time to write data to solid state memory 132 can be due to additional operations involved in identifying and preparing appropriate blocks in solid state memory 132 for receiving data.

Deferred writing is therefore disabled for performance mode in block 207 since the disk pack is at its full operating speed and deferring a write command by writing the data to solid state memory 132 would usually take more time than writing the data to the disk pack.

In block 208, controller 120 checks if any low power state timers have expired. If so, controller 120 in block 210 extends the low power state timer or timers that have expired while in performance mode in order to more quickly perform any host commands that may soon follow.

After extending any expired timers in block 210, or if it is determined in block 208 that no low power state timers have expired, the process returns to block 202 to update the count of received host commands during a new predetermined time period (i.e., a new sliding window) and to determine whether the number of host commands received in the new predetermined time period exceeds the threshold in block 204.

If controller 120 determines in block 204 that the number of host commands received in the predetermined time period does not exceed the threshold, controller 120 sets the timers for a power saving mode in block 212. More specifically, some or all of the timers adjusted in block 206 may be decreased in block 212 so that DSD 106 will enter a low power state more quickly. With reference to the above example timers, controller 120 in block 212 may decrease the timer for parking head 136 from two seconds to one second and decrease the timer for spinning down the disk pack from three seconds to two seconds. The hard disk portion of the NVM will then generally enter these different low power states more quickly with the decreased timers set in block 212.

In block 214, controller 120 enables deferred writing if the disk pack has been spun down to below its operating speed. In this way, controller 120 can determine whether to store data on the disk or in the solid state memory based on whether the number of commands within the predetermined time period exceeds the threshold number of commands. As discussed above, deferred writing can allow for writing of data for host write commands intended for disk 134, for example, to solid state memory 132 and then for later writing the data to its intended location on disk 134. Although not as fast as writing data to disk 134 when it is spun up to its operating speed, enabling deferred writing in block 214 can often allow for quicker writing of the data since disk 134 has spun down below the operating speed. In addition, deferred writing can allow for less power consumption by only having to power solid state memory 132 in the power saving mode and not having to spin up disk 134 and move head 136 which typically requires more power than powering solid state memory 132.

Furthermore, since less than the threshold number of host commands have been received in block 204, it is more likely that host commands received in the power saving mode will be more isolated or less frequent than host commands received when DSD 106 is not in the power saving mode. These generally less frequent host commands received during the power saving mode can often be handled with deferred writing by powering solid state memory 132 on an as-needed basis without having to consume more power by spinning up the disk pack and actuating head 136.

After block 214, the process returns to block 202 to update the count of host commands received in a new predetermined time period.

Figure 3:
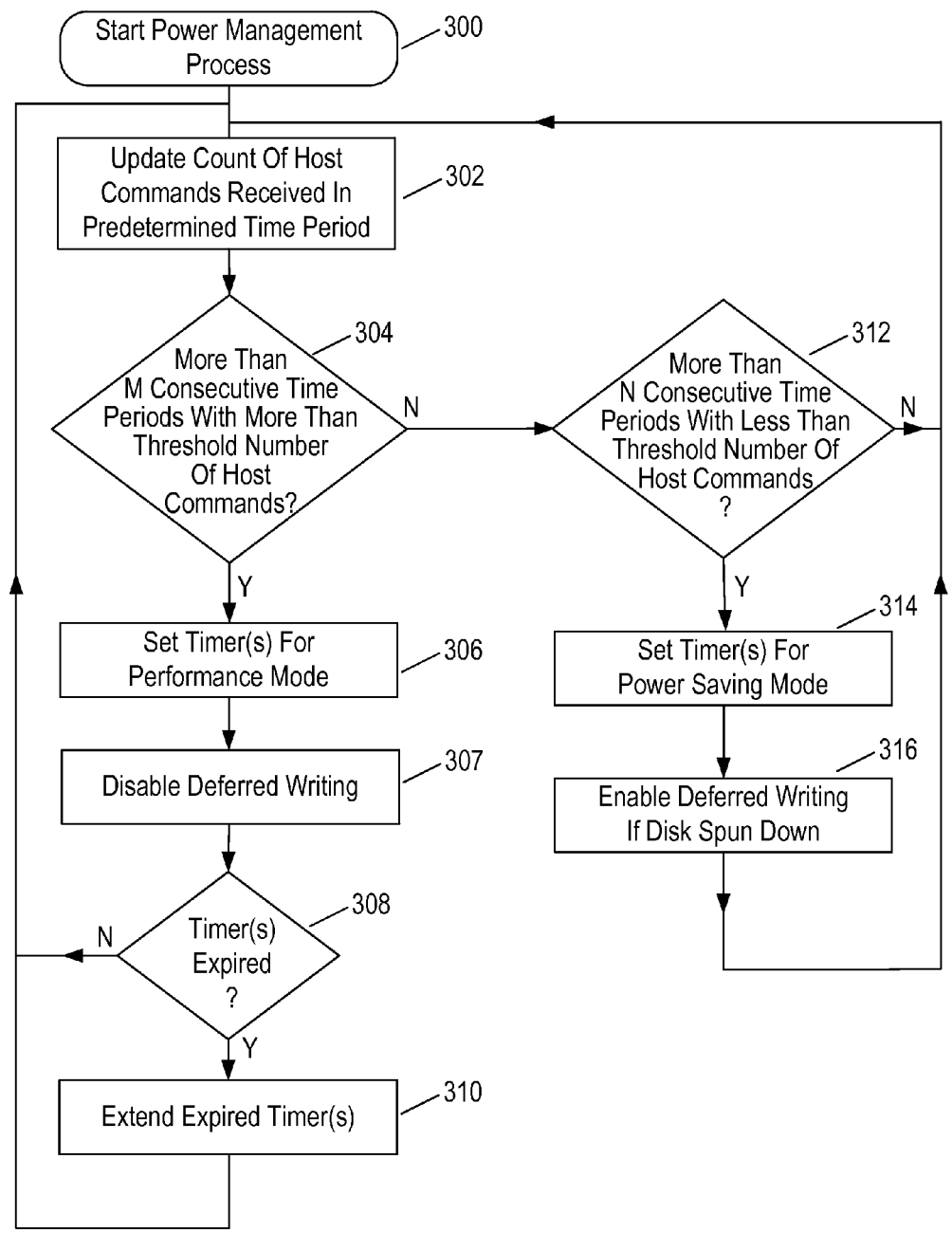
FIG. 3 is a flowchart for a power management process according to another embodiment.

FIG. 3 is a flowchart for a power management process which can be performed by controller 120 according to another embodiment. The process of FIG. 3 begins in block 300 and controller 120 in block 302 updates a count of the number of host commands received from host 101 within a predetermined time period.

In block 304, controller 120 determines whether there have been more than M consecutive time periods with more than the threshold number of host commands to determine whether to set a performance mode. In one implementation, M can equal three so that controller 120 changes power settings for a performance mode after at least three consecutive time periods (i.e., sliding windows) each having more than the threshold number of received host commands.

If it is determined in block 304 that there have not been more than M consecutive time periods with more than the threshold number of received host commands, controller 120 in block 312 determines whether there have been more than N consecutive time periods with less than the threshold number of received host commands. If so, controller 120 adjusts power settings of DSD 106 for a power saving mode in blocks 314 and 316.

By using different values for M and N above, it is ordinarily possible to control how quickly DSD 106 switches to performance mode and power saving mode. For example, if electronic device 100 can allow more power consumption by DSD 106, a smaller value of M can be used so that DSD 106 will enter the performance mode quicker with less consecutive time periods having more than the threshold number of host commands. A higher value for N can also be used in such an example so that more consecutive windows of less than the threshold number of host commands are needed before switching DSD 106 to the power saving mode. Such a change in M and N will typically allow DSD 106 to perform host commands quicker but will likely increase power consumption of DSD 106. Of course, M and N can be adjusted in the opposite direction to conserve more power at a cost in performance.

If controller 120 determines in block 304 that there have been more than M consecutive time periods with more than the threshold number of host commands, controller 120 adjusts the power settings in blocks 306, 307 and 310 for the performance mode. A further description of blocks 306, 307 and 310 can be obtained with reference to the description of similar blocks 206, 207, and 210 provided above for FIG. 2.

On the other hand, if controller 120 determines in block 312 that there have been more than N consecutive time periods with less than the threshold number of host commands, the process proceeds to blocks 314 and 316 to adjust power settings for the power saving mode. A further description of blocks 314 and 316 can be obtained with reference to the description of similar blocks 212 and 214 provided above for FIG. 2.

By determining whether the number of host commands received by DSD 106 has exceeded a threshold within a predetermined time period, it is ordinarily possible to adjust settings for DSD 106 to better adapt to a workload from host 101. Thus, the foregoing power management processes can better balance performance and power requirements for DSD 106 based on the host workload.

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A data storage device (DSD) in communication with a host,
the DSD comprising:
at least one disk for storing data;
a solid state memory for storing data; and
a controller configured to:
count a number of commands received by the DSD from the host within a predetermined time period;
determine whether the number of commands received within the predetermined time period exceeds a threshold number of commands;
store data on the at least one disk and in the solid state memory based on whether the number of commands within the predetermined time period exceeds the threshold number of commands; and
if the number of commands within the predetermined time period exceeds the threshold number of commands, increase an amount of time until the at least one disk enters a low power state.

2. The DSD of claim 1, wherein the controller is further configured to store data for a host command in the solid state memory instead of on the at least one disk if the number of commands received within the predetermined time period does not exceed the threshold number of commands and a rotational speed of the at least one disk does not exceed a predetermined rotational speed.

3. The DSD of claim 1, wherein the controller is further configured to:
set a first timer to initiate the low power state for the at least one disk; and
set a second timer to initiate a low power state for the solid state memory.

4. The DSD of claim 3, wherein if it is determined that the number of commands received within the predetermined time period exceeds the threshold number of commands, the controller is further configured to:
increase the second timer; and
increase the amount of time until the at least one disk enters the low power state by increasing the first timer.

5. The DSD of claim 3, wherein the controller is further configured to decrease the first timer and the second timer if it is determined that the number of commands received within the predetermined time period does not exceed the threshold number of commands.

6. The DSD of claim 3, wherein the controller is further configured to extend after expiration at least one of the first timer and the second timer if the number of commands received within the predetermined time period exceeds the threshold number of commands.

7. A data storage device (DSD) in communication with a host, the DSD comprising:
at least one disk for storing data;
a solid state memory for storing data; and
a controller configured to:
count a number of consecutive time periods where the DSD receives more than a threshold number of commands from the host;
count a number of consecutive time periods where the DSD receives less than the threshold number of commands from the host;
set a performance mode for operation of the DSD if the number of consecutive time periods where the DSD receives more than the threshold number of commands exceeds a first threshold number of time periods; and
set a power saving mode for operation of the DSD if the number of consecutive time periods where the DSD receives less than the threshold number of commands exceeds a second threshold number of time periods.

8. The DSD of claim 7, wherein the controller is further configured to store data for a host command in the solid state memory instead of on the at least one disk while the DSD is in the power saving mode and a rotational speed of the at least one disk does not exceed a predetermined rotational speed.

9. The DSD of claim 7, wherein the controller is further configured to:
set a first timer to initiate a low power state for the at least one disk; and
set a second timer to initiate a low power state for the solid state memory.

10. The DSD of claim 9, wherein the controller is further configured to increase the first timer and the second timer in setting the performance mode.

11. The DSD of claim 9, wherein the controller is further configured to decrease the first timer and the second timer in setting the power saving mode.

12. The DSD of claim 9, wherein the controller is further configured to extend after expiration at least one of the first timer and the second timer while in the performance mode.

13. A method for power management of a data storage device (DSD), the method comprising:
counting a number of commands received by the DSD from a host within a predetermined time period;
determining whether the number of commands received within the predetermined time period exceeds a threshold number of commands;
storing data on at least one disk of the DSD and in a solid state memory of the DSD based on whether the number of commands within the predetermined time period exceeds the threshold number of commands; and
if the number of commands within the predetermined time period exceeds the threshold number of commands, increase an amount of time until the at least one disk enters a low power state.

14. The method of claim 13, further comprising storing data for a host command in the solid state memory instead of on the at least one disk if the number of commands received within the predetermined time period does not exceed the threshold number of commands and a rotational speed of the at least one disk does not exceed a predetermined rotational speed.

15. The method of claim 13, further comprising:
   setting a first timer to initiate the low power state for the at least one disk; and
   setting a second timer to initiate a low power state for the solid state memory.

16. The method of claim 15, wherein if it is determined that the number of commands received within the predetermined time period exceeds the threshold number of commands, the method further comprises:
   increasing the second timer; and
   increasing the amount of time until the at least one disk enters the low power state by increasing the first timer.

17. The method of claim 15, further comprising decreasing the first timer and the second timer if it is determined that the number of commands received within the predetermined time period does not exceed the threshold number of commands.

18. The method of claim 15, further comprising extending after expiration at least one of the first timer and the second timer if the number of commands received within the predetermined time period exceeds the threshold number of commands.

19. A method for power management of a DSD, the method comprising:
   counting a number of consecutive time periods where the DSD receives more than a threshold number of commands from a host;
   counting a number of consecutive time periods where the DSD receives less than the threshold number of commands from the host;
   setting a performance mode for operation of the DSD if the number of consecutive time periods where the DSD receives more than the threshold number of commands exceeds a first threshold number of time periods; and
   setting a power saving mode for operation of the DSD if the number of consecutive time periods where the DSD receives less than the threshold number of commands exceeds a second threshold number of time periods.

20. The method of claim 19, further comprising storing data for a host command in a solid state memory of the DSD instead of on at least one disk of the DSD while the DSD is in the power saving mode and a rotational speed of the at least one disk does not exceed a predetermined rotational speed.

21. The method of claim 19, further comprising:
   setting a first timer to initiate a low power state for at least one disk of the DSD; and
   setting a second timer to initiate a low power state for a solid state memory of the DSD.

22. The method of claim 21, further comprising increasing the first timer and the second timer in setting the performance mode.

23. The method of claim 21, further comprising decreasing the first timer and the second timer in setting the power saving mode.

24. The method of claim 21, further comprising extending after expiration at least one of the first timer and after expiration and/or extending the second timer after expiration while in the performance mode.

* * * * *